United States Patent [19]

Lowrance

[11] Patent Number: 4,729,501
[45] Date of Patent: Mar. 8, 1988

[54] FLAT STICK AUTOMATIC FEEDER APPARATUS

[76] Inventor: Thomas F. Lowrance, 3601 Security St., Garland, Tex. 75040

[21] Appl. No.: 36,714

[22] Filed: Apr. 10, 1987

[51] Int. Cl.⁴ .............................................. B27F 7/00
[52] U.S. Cl. .................................. 227/117; 221/168; 221/203; 227/120
[58] Field of Search ............... 221/167, 168, 203, 237, 221/277; 227/117, 120

[56] References Cited

U.S. PATENT DOCUMENTS

| | | | |
|---|---|---|---|
| 2,167,049 | 7/1939 | Maurath et al. | 221/237 X |
| 2,380,450 | 7/1945 | Klopfer | 221/203 |
| 2,698,478 | 1/1955 | Heisterkamp et al. | 221/237 X |
| 3,316,010 | 4/1967 | Lowrance | 294/87 |
| 3,691,608 | 9/1972 | Lowrance | 29/211 D |
| 4,069,960 | 1/1978 | Lowrance | 227/120 |
| 4,308,974 | 1/1982 | Jones | 221/203 X |
| 4,469,709 | 9/1984 | Schrauf | 221/167 X |
| 4,473,180 | 9/1984 | Lowrance et al. | 227/48 |
| 4,513,856 | 4/1985 | Lowrance et al. | 198/695 |
| 4,615,169 | 10/1986 | Würmli | 221/168 X |
| 4,662,538 | 5/1987 | Goody, Jr. et al. | 221/203 X |

Primary Examiner—Paul A. Bell
Attorney, Agent, or Firm—Hubbard, Thurman, Turner & Tucker

[57] ABSTRACT

Apparatus for automatically inserting flat holder sticks into individual food products such as ice cream bars, wieners, etc, that are securely held in an insertion orientation relative to a plurality of feed paths in which sticks are ejected. Comprising the apparatus is an upstanding open hopper into which a batch of unaligned sticks is indiscriminately placed. The hopper overlies a plurality of parallel arranged agitating mechanisms each power operative to orient and dispense individual flat sticks gravity supplied from the hopper into a stacked relation within a plurality of individual spaced apart feed slots. A carriage supporting an ejection bar slidably contained in each of the feed slots is actuated continually for ejecting the bottommost stick outward from the bottom of each feed slot until inserted into the recipient product externally secured in the coincident feed plane adjacent to the apparatus.

15 Claims, 8 Drawing Figures

FLAT STICK AUTOMATIC FEEDER APPARATUS

TECHNICAL FIELD

The field of art to which the invention relates comprises the art of elongated member driving apparatus as specifically adapted to the inserting of flat sticks into food products such as wieners.

BACKGROUND OF THE INVENTION

Many popular food products such as ice cream bars, corny dogs, etc., are marketed with an outward projecting stick whereby the item can be individually hand held and oriented while being eaten without directly handling the food item per se. For minimizing costs associated with producing food products of that type they are by and large mass produced with the use of increasingly automated equipment for maximizing the elimination of hand labor. One important aspect of the production process has been the insertion of the holder stick into the food item itself. In my U.S. Pat. No. 3,691,608 there is disclosed a semi-automatic feeding apparatus for inserting sticks of circular cross section into food articles. In my prior U.S. Pat. No. 4,069,960 there is disclosed semi-automatic apparatus for inserting flat sticks into food articles. Associated with the latter is a hopper box in which sticks are initially placed to provide the source from which the sticks are to be dispensed for insertion into the food article. Characterizing operability of the hopper box and feed mechanism thereof is a requirement for a prestacking alignment of the stick supply. While that device has now served the industry well for many years, it has been recognized as desirable to further reduce operating costs by increased automation via eliminating the previous preliminary step of stick stacking.

Despite recognition of the problem a solution therefor has not been previously known.

SUMMARY OF THE INVENTION

This invention relates to apparatus for the automatic feeding of flat sticks. More specifically, the invention relates to such apparatus operable in conjunction with external apparatus supporting individual food items in which the sticks are to be inserted. When the food item is ultimately to be consumed, the stick provides a holding support whereby the item can be conveniently oriented while being eaten without the need for eating utensils and without need to handle the food directly.

In accordance with the invention, automatic flat stick insertion is achieved by the apparatus hereof comprising a rectangular upstanding open hopper overlying a plurality of parallel arranged continuously operable agitating mechanisms. Each of the agitating mechanisms are simultaneously operative to receive for alignment and for dispensing otherwise unaligned individual sticks gravity supplied from the hopper into a stacked relation within a plurality of individual feed slots. Reciprocably operable ejection bars are continually actuated to force a stick from the bottom of its respective feed slot outward thereof into a recipient food product externally supported in the coincident feed plane of the ejection bar.

It is therefore an important aspect of the invention to enable a bundle or batch of insertable sticks that are casually dumped or otherwise placed in the hopper without the need for previous stacking or prealignment to be fed out and inserted automatically into externally supported food articles.

It is a further important aspect of the invention that the apparatus hereof is able to align otherwise unaligned sticks being supplied by gravity from a hopper source and per se stack the sticks in a vertical orientation for feeding the sticks seriatim from the stack and into the recipient food product externally supported in the stick feed path thereof.

It is a still further important aspect of the invention that a plurality of flat sticks are automatically fed simultaneously into a plurality of food articles individually supported pre-aligned with the plurality of feed paths emerging from the apparatus.

In accordance with yet a further aspect of the invention the apparatus is operative at a frequency or rate correlated to the rate at which the recipient food products can be cycled into and out of stick receiving relation continually so long as the source supply of sticks in the hopper bin is maintained.

The above noted features and advantages of the invention as well as other superior aspects thereof will be further appreciated by those skilled in the art upon reading the detailed description which follows in conjunction with the drawings.

DESCRIPTION OF THE PREFERRED EMBODIMENT

Figure 1:
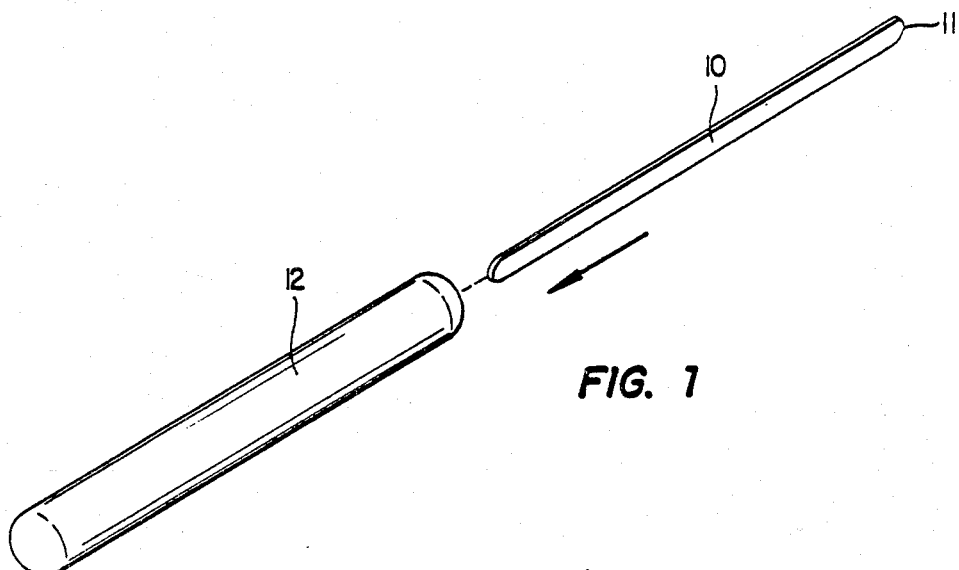
FIG. 1 is an isometric view of a stick to be inserted into a wiener as contemplated herein.
Figure 3:
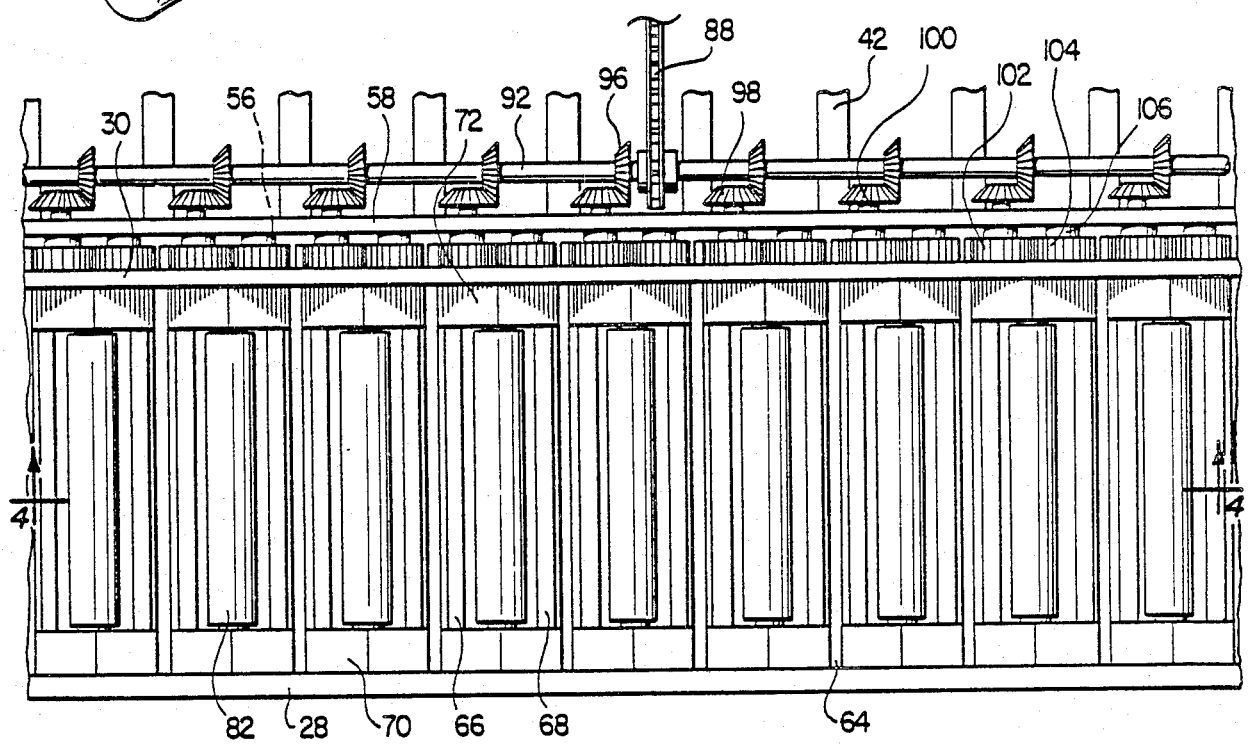
FIG. 3 is a plan view of the apparatus.
Figure 4:
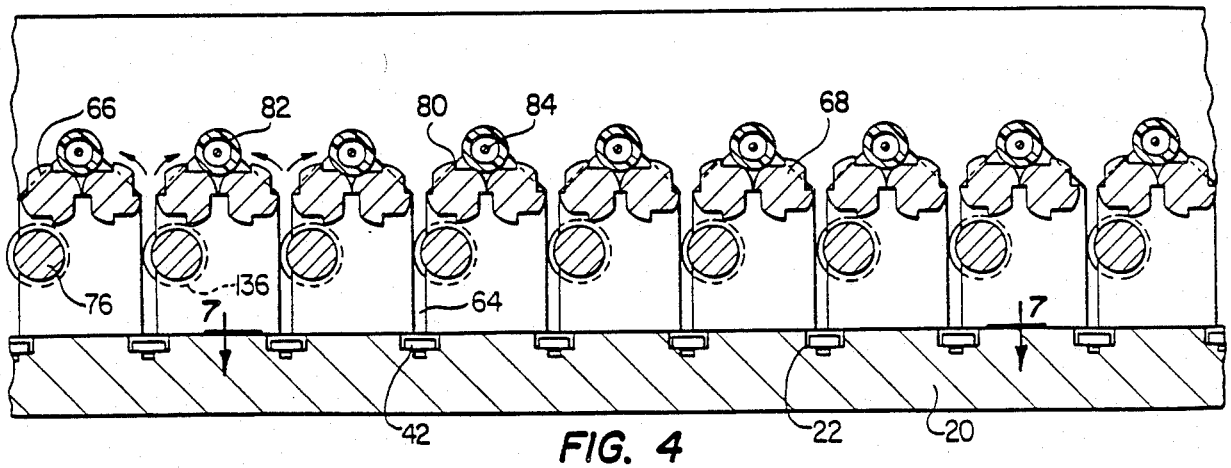
FIG. 4 is a sectional view as seen substantially from the position 4—4 of FIG. 3.

In the description which follows, like parts are marked throughout the specification and drawings with the same reference numerals respectively. Drawing figures are not necessarily to scale and in certain views parts may be drawn rotated into the plane of the drawing for purposes of clarity.

Referring first to FIG. 1, there is illustrated a flat stick 10 of a type contemplated to be fed by the apparatus hereof on engaging stick end 11 for insertion into a wiener 12. Typically, such sticks are about ¼ inches wide, 3/32 inches thick and approximately 5½ inches long. About 2 inches of length is normally inserted into the wiener while the remainder projects outwardly thereof for hand holding the item as is well known.

Referring now to the remaining figures, the apparatus hereof is designated 14 for simultaneously feeding and inserting a plurality of individual sticks 10. For these purposes, apparatus 14 is adapted to cooperate with an externally positioned wiener holder unit 16 which may for As provided by holder 16, each wiener 12 in which an individual stick 10 is to be inserted is contained in one of a plurality of elongated chambers 18 coincidentally spaced apart and in the feed plane of the stick feed of the apparatus 14 as will be understood.

Figure 2:
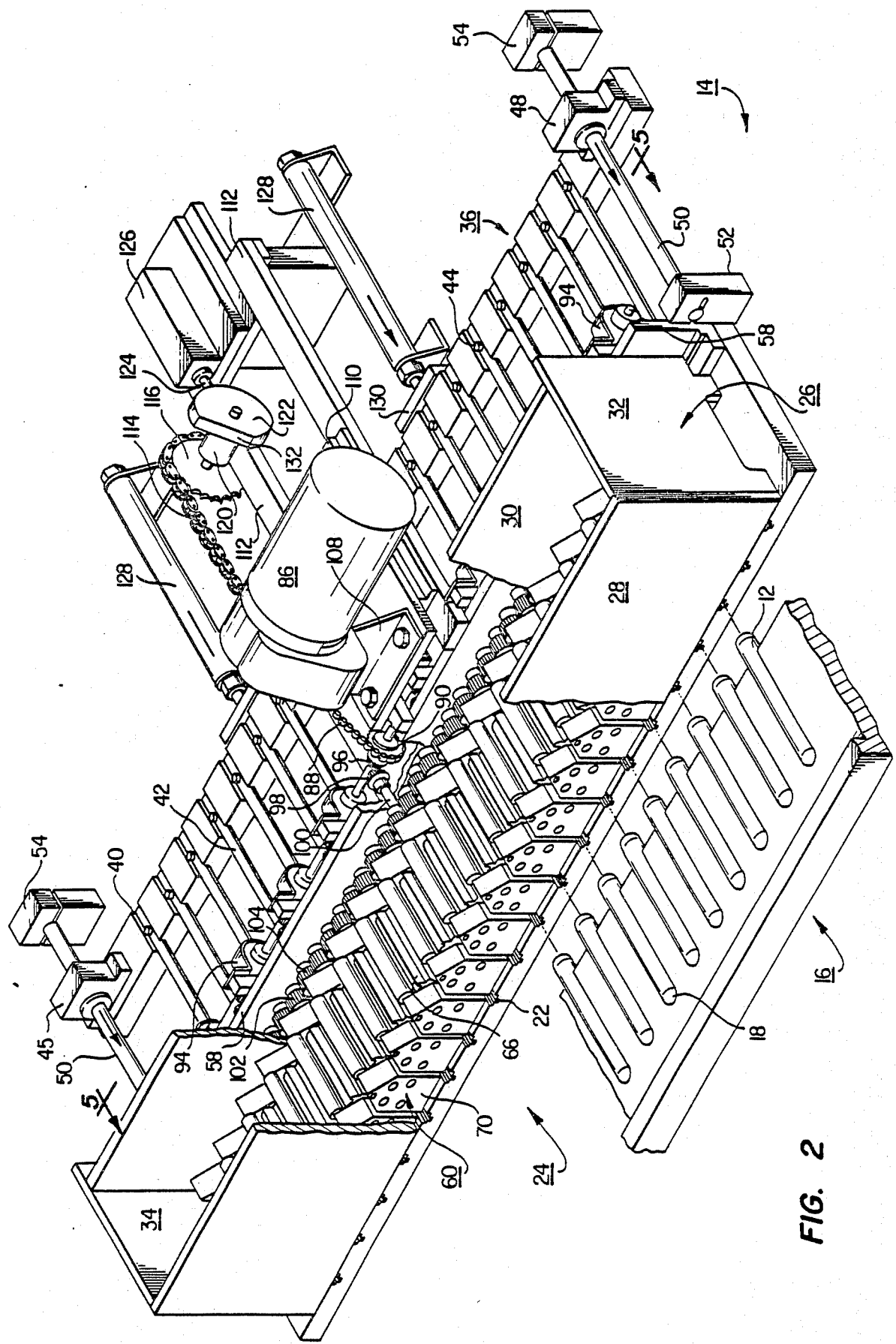
FIG. 2 is a topside isometric view of the flat stick automatic feeder apparatus hereof.
Figure 5:
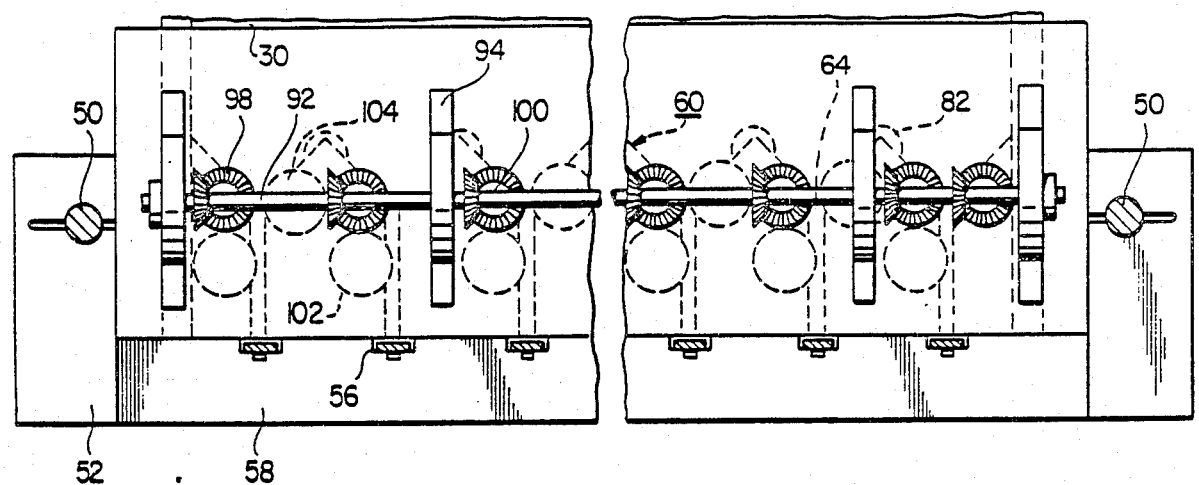
FIG. 5 is a rear view as seen substantially from the position 5—5 of FIG. 2.

Comprising apparatus 14 is a base plate 20 containing on its upper surface a plurality of spaced apart and parallel elongated T-shaped slots 22 having an underslot 23 from which individual sticks 10 are to be ejected outward. Secured to the base plate is an agitator mechanism 24, as will be described, and about which is positioned an upstanding stick hopper 26 comprised of front wall 28 rear wall 30 and side walls 32 and 34. For ejecting the sticks individually from each of the slots 22 there is provided a carriage 36 positioned behind the agitator mechanism 24 and adapted for reciprocal displacement when actuated of a tranversely arranged elongated push bar 38. Formed in the push bar are a plurality of individual longitudinal slots 40 in which are secured the rearward ends of longitudinal parallel arranged ejection bars 42. The bars are individually secured thereat via a bolt 44 and extend through guide plate 58 into feed slots 22 as will be explained. Supporting push bar 38 for displacement toward and away from the base plate 20 are pillow blocks 46 and 48 (FIG. 2) at opposite ends of the push bar and through which there is provided a guide shaft 50 extending between spaced apart support blocks 52 and 54. From the pushbar 38, each of the ejector bars 42 extends through a corresponding slot 56 (FIG. 5) provided in ejector guide plate 58 secured to base plate 20 and extending transversely along the backside of rear hopper wall 30.

In order for the individual sticks 10 to reach slots 22 they are initially dumped or otherwise supplied into hopper 26 from which they gradually descend by gravity into an agitator mechanism 24 as will now be described. Comprising the agitator mechanism 24 are a plurality of individual agitator units 60 arranged parallel and spaced apart to define between each adjacent pair of units an intervening vertical and longitudinal slot 64. The sticks 10, after being agitated by mechanism 24, are urged stacked and aligned along their edge faces into slot 23 of the feed slot 22.

Figure 6:
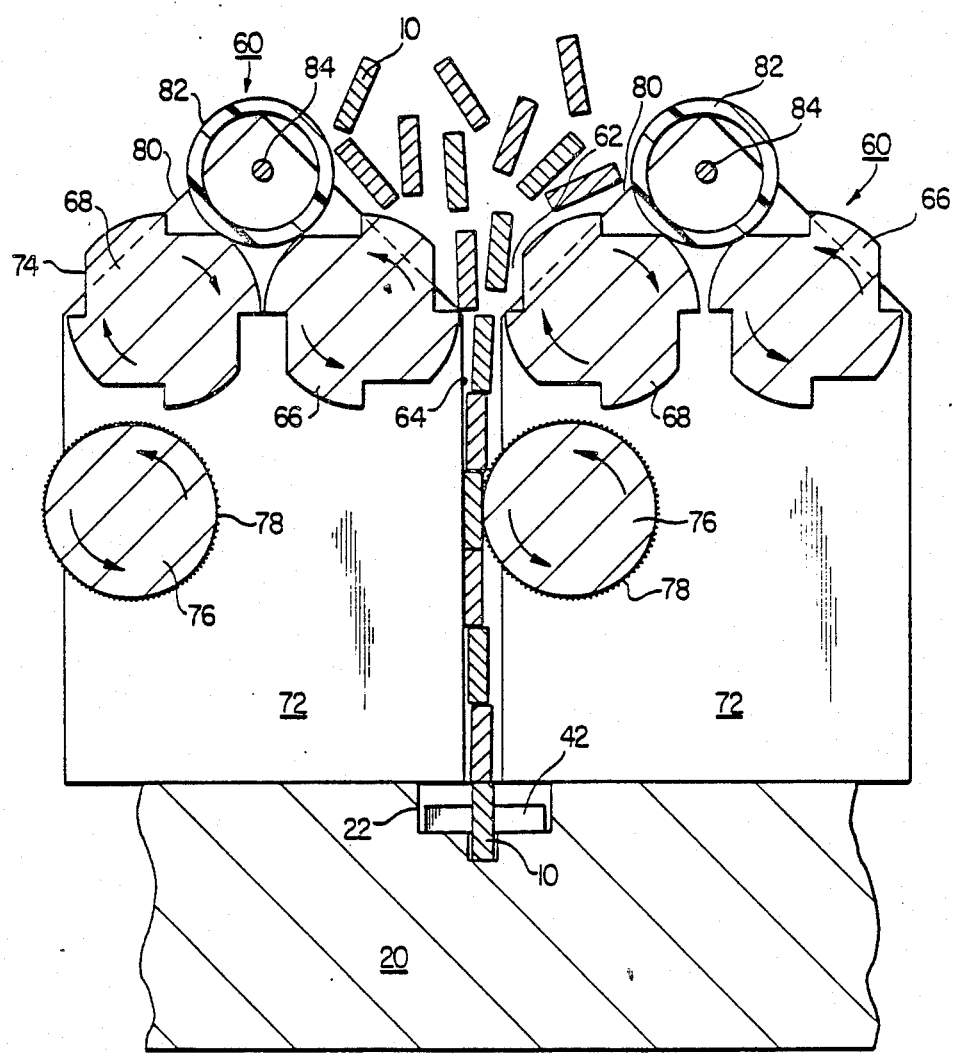
FIG. 6 is an enlarged view of the encircled portion 6 of FIG. 4.

Forming each of the agitator units 60 is a pair of cooperating agitator rollers 66 and 68 having their opposite ends supported for rotation between a front agitator block 70 and a rear agitator block 72. Each agitator block is secured in turn to base plate 20 and along their upper surfaces define opposing ramps 80. Between the agitator blocks, each of the agitator rollers 66 and 68 are of enlarged diameter in which are contained a plurality of circumferentially spaced longitudinal L-shaped flutes 74. In the preferred embodiment, the shafts 66 and 68 rotate in opposite directions and each contains four flutes 74 which in the course of rotation encounter the individual gravity supplied sticks 10. Being that the sticks are longer than the longitudinal spacing between blocks 70 and 72 engagement of the fluted rollers against the loosely contained sticks serves as they rotate to agitate and discharge the sticks onto ramps 80. In the course thereof, the sticks are aligned until being gradually discharged onto ramps 80 overlying the upper ingress opening 62 to slot 64 as shown in FIG. 6.

Positioned axially parallel beneath each of the agitator rollers 68 and laterally protruding inward of the slot 64 is a pull roll 76 having a knurled surface 78 which engages each encroaching stick for urging the sticks downward toward the slot 22. For preventing the agitated sticks 10 at ingress opening 62 from entering between agitator rollers 66 and 68 there is provided an elongated tubular sleeve 82 loosely supported in a floating relation about a small diameter elongated rod 84. The axis of rod 84 is aligned positioned overlying the circumferential gap spacing between the rollers. Sleeve 82 is typically formed of a tough polymer plastic composition characterized by being able to withstand the abuse it receives from its floating contact with the flutes 74.

The rotatable drive for the rollers 66 and 68 and the other elements of agitator mechanism 24 is provided from motor 86 through a chain 88 engaging a chain sprocket 90. The sprocket in turn is supported on an elongated transverse drive shaft 92 that substantially spans the entire agitator assembly. Supporting the drive shaft 92 at spaced locations along the backside of guide plate 58 are a plurality of spaced apart pillow blocks 94 each providing a journal bearing not shown for shaft rotation. Secured to drive shaft 92 at sprocket 90 and at each of the pillow blocks 94 is a bevel gear 96 in mesh engagement with a bevel gear 98 mounted on the agitator drive shaft 100 representing a rear end extension of agitator roller 66. Behind rear agitator block 72 and between the block and ejector guide plate 58 on extension 100 of roller 66 is a spur gear 102 mounted for rotation thereon and supported in mesh engagement with a spur gear 104 mounted on an end extension 106 of roller 68. While not critical, the rotational rate of rollers 66 and 68 is on the order of about 12 RPM. Also meshng with spur gear 102 is a spur gear 136 mounted on the rear extension of pull roll 76 for effecting rotation of the latter.

Supporting motor 86 in the above arrangement are a pair of opposite angle brackets 108 mounted on a platform 110 in turn supported on spaced rails 112. Also driven simultaneously by motor 86 is a timing chain 114 engaging a rotational timing sprocket 116, the latter being mounted on a rod shaft 118. Journal bearing 120 supports shaft 118 which in turn supports a rotational ejector cam 122 for operatively depressing and releasing the plunger 124 of an air cylinder solenoid 126 in a controlled timed sequence. Pneumatically energized and de-energized by compressed air supplied via solenoid 126 are a pair of parallel spaced apart double acting push bar cylinders 128 each connected via a block 130 to the back face of push bar 38. In this manner, displacement of carriage 36 toward and away from the agitator mechanism 24 in order to displace ejection bars 42 relatively inward and outward of T slots 22 is controlled in a timed sequence determined by the follower profile 132 of cam 122.

In operation, apparatus 14 is rendered operative by motor 86 which when energized continuously rotates agitator rollers 66 and 68 for agitating sticks 10 and pull roller 76 for forcing the sticks into feed slots 23. The supply of sticks 10, when deposited into hopper 26, are randomly placed or dumped manually and after being agitated would normally have a general orientation as illustrated in FIG. 6 above the agitator mechanism 60. The sticks may or may not be casually distributed by hand when initially deposited in the hopper so as to maintain coverage over the entire plurality of agitator mechanisms being utilized. Distribution in this manner tends to avoid one or more of the agitator mechanisms from becoming stick starved as might otherwise occur should the sticks become locally bunched at one or more of the hopper ends.

The underlayer of sticks 10 immediately overlying the agitator mechanism 24 along ramps 80 are continuously agitated by the rotational engagement of rollers 66 and 68 and the longitudinal flutes 74 thereof. The flutes on engaging a stick will tend to carry the sticks rotationally upward toward the floating sleeve 82 until being discharged against ramps 80. The effect thereof is to cause alignment of any misalignment as may exist enabling the sticks to drop into ingress 62 of vertical slot 64. As the sticks in slot 64 begin to stack, the lowermost thereof is engaged by the knurled surface 78 of rotating pull roll 76 so as to force each encroaching stick seriatim downward into the edgewise recess 23 of feed slot 22.

A quantity of food product such as wieners 12 corresponding in number to the number of feed slots 22 contained in the holder 16 are supported externally in the feed paths of the sticks as the sticks are to be ejected from slots 23 by means of ejector bars 42. By rotational operation of timing cam 122, the follower face 132 thereof effects a continual on-off cycled operation of air solenoid 126 for extending and retracting the pistons of air cylinders 128 to actuate operation of carriage 36. As the pistons extend and retract, push bar 38 is caused to be moved toward and away from agitator mechanism 24. Movement of the push bar 38 causes like movement of carriage 36 and its component parts from the retracted relation of FIG. 7A to the extended stick ejection relation of FIG. 7B. Prior to extension of the cylinders, the distal end 43 of each ejector bar 42 is positioned in the entrance of a corresponding slot 22 substantially contiguous against the end 11 thereat of stick 10. As the cylinders 128 are energized via air solenoid 126, their pistons gradually extend to displace push bar 38 in the direction 138 displacing sticks 10 within slot 22 until inserted within wiener 12 as shown in FIG. 7B. After insertion is completed the carriage 36 is withdrawn by retracting cylinder pistons 128.

Figure 7A:
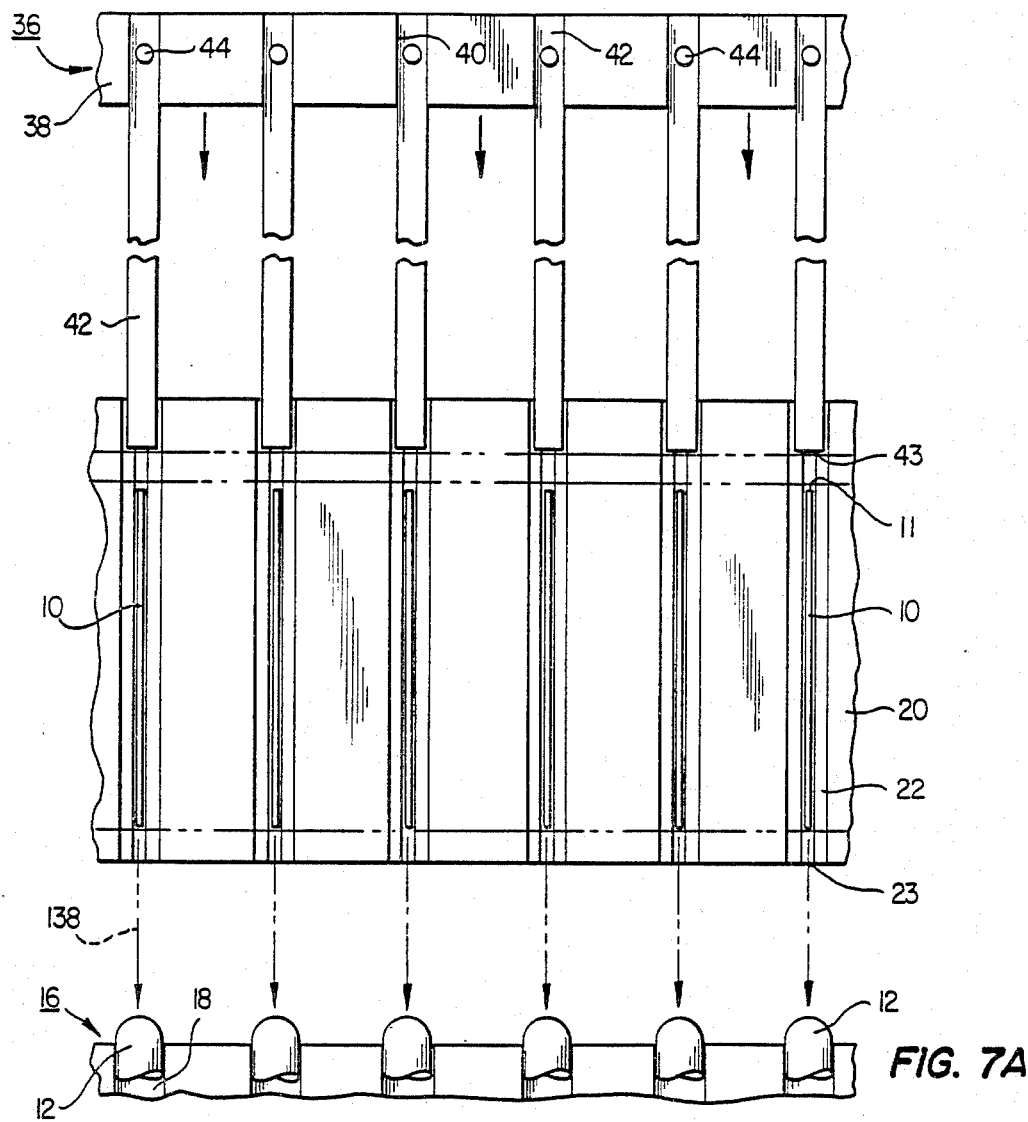
FIGS. 7A and 7B are plan views of the stick feed ejection bars in their retracted and extended ejection relations respectively.
Figure 7B:
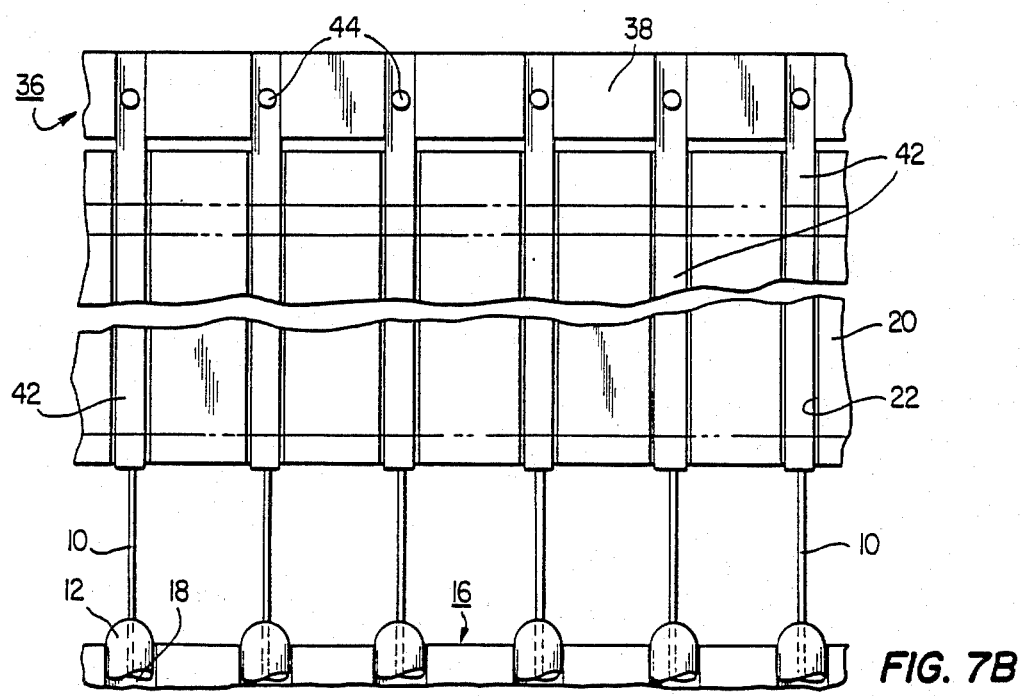

With each of the plurality of T slots 22 containing a stick 10, the ejector bar simultaneously displace the sticks from the relation of FIG. 7A until inserted into the food product 12 as illustrated in FIG. 7B. After each batch insertion of sticks into the food products is completed, a fresh reload of food product is effected by replacing holder 16 with a new batch into which the sticks are to similarly be inserted. The frequency rate of insertion is somewhat dictated by the rate at which a fresh batch of food product, such as wieners 12, can be recycled following completion of each insertion cycle. Where holders 16 are supported on a turret mechanism or the like, recycling can be readily synchronized with the operation of apparatus 14 in order to minimize the downtime that causes delay and would otherwise be required with a manual replacement.

By the above description there is disclosed a novel apparatus for automatic feed insertion of stick holders into food products into which such sticks are to be placed. By use of an agitator mechanism associated with a hopper source of freely positioned sticks, the sticks need not be prealigned or prestacked in the manner of the prior art thereby achieving a significant labor saving as compared to prior feed apparatus available for that purpose. In this manner, manual intervention is only required to maintain an adequate stock supply of sticks in the hopper but does not require shut down, and does not require prehandling of the sticks for stacking, alignment and/or placement in the hopper in the manner previously resorted to. Elimination of manual intervention represents a significant and virtuous achievement by optimally reducing the costs associated with fabrication of the food product on its way to market. Since such products are highly cost competitive, the realized cost savings however minute for each individual food item add up to a considerable savings in the mass production processes by which the purchased food products are prepared. Whereas the preferred embodiment has been described in terms of inserting sticks into food products, it should be evident that the apparatus of the invention can similarly be used elsewhere in association with any article in which a stick is to be inserted.

Since many changes could be made in the above construction and many apparently widely different embodiments of this invention could be made without departing from the scope thereof, it is intended that all matter contained in the drawings and specification shall be interpreted as being illustrative and not in a limiting sense.

I claim:

1. Apparatus for inserting elongated flat sticks each of width greater than its thickness into articles and comprising in combination:
   (a) stick source means for receiving and containing a generally random alignment of flat stick quantities supplied for insertion;
   (b) feed slot means defining an ejection path from which sticks are to be ejected and inserted into an article supported beyond the outlet thereof in said ejection path;
   (c) agitator means continuously receiving the flat sticks in a generally random alignment from said stick source means to effect an orientation alignment of the sticks for dispensing into said feed slot means;
   (d) a dispensing slot in communication with said feed slot means from the vicinity of said agitator means and having a width dimension less than the width of sticks to be dispensed; and
   (e) ejector means operable within said feed slot means to eject a stick from said feed slot means and insert the ejected stick into a recipient article supported within the ejection range of said ejection path.

2. Apparatus in accordance with claim 1 in which said agitator means comprises a plurality of agitating mechanisms commonly receiving sticks from said stick source means, said feed slot means comprises a plurality of parallel spaced apart individual feed slots into which the sticks are dispensed and said ejection means is operative to concomitantly eject and insert sticks from said plurality of slots into a plurality of recipient articles supported in the ejection paths thereof.

3. Apparatus in accordance with claim 2 in which said agitator means is operative continuously and said ejector means is operative continually in a timed cycle relation to the operation of said agitator means.

4. Apparatus in accordance with claim 2 in which said agitator means comprises a pair of juxtaposed parallel agitator rollers supported for rotation, each of said agitator rollers contain at least one longitudinal flute formed in the periphery thereof, and there is included drive means to effect rotation of said agitator rollers whereby the rotating peripheries of said rollers engage and agitate sticks being received from said stick source means for effecting aligned orientation dispensing thereof into said feed slots.

5. Apparatus in accordance with claim 4 in which each of said agitator rollers contain a plurality of said longitudinal flutes uniformly spaced about the circumference of said rollers.

6. Apparatus in accordance with claim 5 in which said flutes are L-shaped in section.

7. Apparatus in accordance with claim 4 in which said pair of agitator rollers comprises an agitator unit and there is included at least two juxtaposed agitator units arranged parallel and spaced apart to define an intervening vertical passage in which agitated sticks are received at the upper opening of said passage and dispensed downward into one of said feed slots in communication with the under opening of said passage, and said agitator means is effective to orient the agitated sticks into the upper opening of said passage means.

8. Apparatus in accordance with claim 7 in which the upper opening of said intervening vertical passage is defined by cooperating ramp surfaces on the juxtaposed of said agitator units and said agitator rollers in the course of rotation operatively discharge sticks received in said flutes against said ramp surfaces.

9. Apparatus in accordance with claim 7 in which said agitator units include a pull roller supported for rotation beneath said agitator rollers to rotationally penetrate said vertical passage and urge sticks seriatim in said passage downward into the feed slot thereat.

10. Apparatus in accordance with claim 7 in which said agitator rollers of said agitator units are rotated in opposite directions toward each other along their upper peripheries and said agitator units include entry prevention means preventing entry of sticks being agitated to between said agitator rollers.

11. Apparatus in accordance with claim 10 in which said entry prevention means comprises an elongated tubular sleeve extending parallel to said agitator rollers overlying the intervening gap therebetween and said sleeve is supported for floating engagement with the circumferential surface of said rollers.

12. Apparatus for inserting elongated flat sticks each of width greater than its thickness into articles and comprising in combination:

(a) hopper means for receiving and containing a generally random alignment of flat stick quantities supplied for insertion;
(b) feed slot means defining an ejection path from which sticks are to be ejected and inserted by ejection means into an article supported beyond the outlet thereof in said ejection path;
(c) agitator means continuously receiving the flat sticks in a generally random alignment from said stick source means to effect an orientation alignment of the sticks for dispensing into said feed slot means;
(d) a dispensing slot in communication with said feed slot means from the vicinity of said agitator means and having a width dimension less than the width of sticks to be dispensed; and
(e) ejector means reciprocably operable within said feed slot means to eject a stick from said feed slot means and insert the ejected stick into a recipient article supported within the ejection range of said ejection path, said ejector means comprising an ejection bar slidably contained within said feed slot means and displaceable from a first position behind a stick in said feed slot means to a second position ejecting the stick to outward of said feed slot means.

13. Apparatus in accordance with claim 12 in which said feed slot means comprises a plurality of parallel spaced apart feed slots and there is included an ejection bar in each of said feed slots for concomitantly ejecting a plurality of sticks for insertion.

14. Apparatus in accordance with claim 13 including drive means for continually operating said ejector means in a predetermined timed sequence.

15. Apparatus in accordance with claim 14 including a pneumatic unit operable when actuated to effect displacement of said ejection bars from said first to said second positions.

* * * * *

UNITED STATES PATENT AND TRADEMARK OFFICE
CERTIFICATE OF CORRECTION

PATENT NO. : 4,729,501

DATED : March 8, 1988

INVENTOR(S) : Thomas F. Lowrance

It is certified that error appears in the above-identified patent and that said Letters Patent is hereby corrected as shown below:

Column 2, Line 64    after "for" insert the following:
--example be of a type described in my aforesaid U.S. patent 4,069,960.--

Signed and Sealed this

Ninth Day of August, 1988

Attest:

DONALD J. QUIGG

Attesting Officer     Commissioner of Patents and Trademarks